US008364438B2

(12) United States Patent
Behan et al.

(10) Patent No.: US 8,364,438 B2
(45) Date of Patent: Jan. 29, 2013

(54) METHODS, SYSTEMS, AND FORMATS FOR DATA, SUCH AS DATA USED IN LASER PROJECTION OF FASTENERS USED IN MANUFACTURING

(75) Inventors: William M. Behan, St. Peters, MO (US); Tracy L. Bagwill, Wildwood, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/230,230

(22) Filed: Sep. 12, 2011

(65) Prior Publication Data

US 2012/0004752 A1 Jan. 5, 2012

Related U.S. Application Data

(62) Division of application No. 12/247,007, filed on Oct. 7, 2008, now Pat. No. 8,036,852, which is a division of application No. 10/990,196, filed on Nov. 16, 2004, now Pat. No. 7,433,796.

(51) Int. Cl.
*G06F 15/00* (2006.01)

(52) U.S. Cl. ....................................... 702/150
(58) Field of Classification Search ............. 702/150
See application file for complete search history.

(56) References Cited

U.S. PATENT DOCUMENTS

| 5,311,018 | A | 5/1994 | Zana et al. |
| 5,381,258 | A | 1/1995 | Bordignon et al. |
| 5,430,662 | A | 7/1995 | Ahonen |
| 5,573,825 | A | 11/1996 | Brewster |
| 5,691,815 | A * | 11/1997 | Huber et al. ............... 356/623 |
| 6,066,845 | A | 5/2000 | Rueb et al. |
| 6,170,163 | B1 | 1/2001 | Bordignon et al. |
| 6,317,980 | B2 | 11/2001 | Buck, III |
| 6,731,991 | B1 | 5/2004 | Michalski et al. |
| 6,828,525 | B1 | 12/2004 | Hayes et al. |
| 6,935,748 | B2 | 8/2005 | Kaufman et al. |
| 7,193,696 | B2 | 3/2007 | Engelbart et al. |
| 7,433,796 | B2 | 10/2008 | Behan et al. |
| 2005/0135670 | A1 | 6/2005 | Vaidyanathan |
| 2005/0282084 | A1 | 12/2005 | Barr et al. |
| 2006/0016957 | A1 | 1/2006 | Hofmann |
| 2006/0103853 | A1 * | 5/2006 | Palmateer ............... 356/601 |
| 2009/0037138 | A1 | 2/2009 | Behan et al. |

OTHER PUBLICATIONS

Mason, Karen Fisher, "Sizing up laser placement systems—Mar. 2004," Composites World, http://www.compositesworld.com/hpc/issues/2004/March/391, accessed Aug. 19, 2004, 5 pages.

* cited by examiner

*Primary Examiner* — Cindy H Khuu
(74) *Attorney, Agent, or Firm* — Perkins Coie LLP (57) ABSTRACT

A system and method provides data for a laser projection process used in manufacturing involving fasteners. For example, the laser projection process may include projecting a laser image associated with fasteners used to assemble objects. Fastener attribute data may be extracted from an engineer's design data and processed to generate a laser projection output file. This output file may include geometric data used to project a laser image associated with the fasteners. For example, this image may be an outline indicating the location, shape, and orientation of a fastener. The output file may also include non-geometric data associated with attributes of the objects to be assembled. Both the geometric and the non-geometric data can then be displayed in a user interface, such as a display screen of a laser projector control device, in addition to the display of the laser image in three-dimensional space.

13 Claims, 9 Drawing Sheets

| | | | |
|---|---|---|---|
| Owning part: | Reference to file location of owning part | | |
| Layer: | 11 | Type: | Group |
| Width: | Thin | Number of Members: | 3 |
| Number of Levels: | 1 | Number of Geometric Objects: | 3 |
| Number of Subgroups on First Level: | 0 | | |
| Object Dependency Graph: | Group - UN | | |

Fastener Group Object — 306

- X: 302 = 22.507752
- Z: 304 = 128.243080
- J: = -0.003035
- Y: 302 = 364.716020
- I: 304 = 0.997992
- K: = 0.063269
- 318 OFFSET: = 0.000000
- 320 LABEL: = UN00000012
- 316 WET_INSTALL: = YES
- 322 COLD_WORK_REQD: = NO
- 326 SURFACE: = ..........
- 328 FASTENER_TYPE: = ..........
- 330 COUNTERSINK: = NO
- 310 HOLE_DIA: = 0.250+0.004-0.000
- 308 HOLE_NO: = FRAME1-0008
- 312 NUT_COL: = ST3M719C4M2 PLATENUT
- 309 FAST_NO: = 3M1169V4-($0) BOLT
- 336 STACKUP: = 0.234
- 314 FLAGNOTE: = 5
- 324 PIERCE_ANGLE: = 0.04 degrees
- 332 GRIP_LENGTH: = 4
- 334 TACK_RIVET: = 2X RIVET

*FIG. 3*

| | |
|---|---|
| Edge of Part Point Object 1 | Owning part DEMO/001<br>Layer 11<br>Type Point<br>Modified Version 16<br>Created Version 16<br>A Member Of Group FRAME1_EOP<br>Information Units Inches<br>Coordinates XC = 21.1837887672550    X = 21.1837887672550<br>            YC = 329.6554500832900    Y = 329.6554500832900<br>            ZC = 131.9383127630600    Z = 131.9383127630600<br>Object Dependency Graph:       Point - ID 24529 |
| Edge of Part Point Object 2 | Owning part DEMO/001<br>Layer 11<br>Type Point<br>Modified Version 16<br>Created Version 16<br>A Member Of Group FRAME1_EOP<br>Information Units Inches<br>Coordinates XC = 21.0787489998240    X = 21.0787489998240<br>            YC = 329.8304313406000    Y = 329.8304313406000<br>            ZC = 132.7579329056900    Z = 132.7579329056900<br>Object Dependency Graph:       Point - ID 24530 |
| Edge of Part Point Object 3 | Owning part DEMO/001<br>Layer 11<br>Type Point<br>Modified Version 16<br>Created Version 16<br>A Member Of Group FRAME1_EOP<br>Information Units Inches<br>Coordinates XC = 20.9852028679960    X = 20.9852028679960<br>            YC = 329.9676076966300    Y = 329.9676076966300<br>            ZC = 133.4004731767100    Z = 133.4004731767100<br>Object Dependency Graph:       Point - ID 24531 |
| Edge of Part Point Object N | ... |

| Fastener Type | Fastener Geometry | Laser Projection Symbol |
|---|---|---|
| Generic Fastener | ⊕ | + (712) |
| Generic Nut | ⬡ | ⊞ (710) |
| Two Sided Lug Nut Plate | | ⊞ (702) |
| One Sided Lug Nut Plate | | ⊞ (706) |
| Corner Nut Plate | | ⟁ (708) |
| Gang Channel | | ⊞ ⊞ ◇ (704) |

METHODS, SYSTEMS, AND FORMATS FOR DATA, SUCH AS DATA USED IN LASER PROJECTION OF FASTENERS USED IN MANUFACTURING

CROSS-REFERENCE TO RELATED APPLICATION

This application is a division of U.S. patent application Ser. No. 12/247,007, filed Oct. 7, 2008, which issued on Oct. 11, 2011 as U.S. Pat. No. 8,036,852, entitled METHODS, SYSTEMS, AND FORMATS FOR DATA, SUCH AS DATA USED IN LASER PROJECTION OF FASTENERS USED IN MANUFACTURING, which is a divisional of U.S. patent application Ser. No. 10/990,196, filed Nov. 16, 2004, which issued on Oct. 7, 2008 as U.S. Pat. No. 7,433,796, entitled METHODS, SYSTEMS, AND FORMATS FOR DATA, SUCH AS DATA USED IN LASER PROJECTION OF FASTENERS USED IN MANUFACTURING, each of which is incorporated herein by reference in its entirety.

TECHNICAL FIELD

The present invention relates generally to methods and systems for configuring and formatting data, for example, methods and systems for configuring and formatting data used in a manufacturing laser projection process.

BACKGROUND

The use of laser projection processes in manufacturing, such as manufacturing in the aerospace and automotive industries, provides many advantages. For example, when multiple components (e.g., airplane parts) are to be assembled together, laser projection techniques can be used to determine the correct location and orientation of the components to be assembled and to project the corresponding fastener locations directly on the component surfaces. This allows an assembler to quickly and accurately locate and drill the fastener holes eliminating the need for specialized tooling and drilling templates, which, in the past, have proven to be cumbersome as well as resource intensive.

Typically, laser projection processes involve modeling structural requirements with a computer aided design (CAD) tool, such as Unigraphics or CATIA, and then converting some of the geometric information generated using this computer-aided design tool into another file format used by the laser projector. For example, when fastener locations are to be laser projected, a three-dimensional symbol, such as a crosshair, must be modeled and stored for each fastener location in the CAD model, which can equate to several thousand locations on a typical aircraft assembly. These three-dimensional symbols are then converted into another file format suitable for the laser projector.

While current laser projection techniques have many advantages and virtually eliminate the need for specialized tooling and drill templates, such laser projection techniques have limitations. For example, current projection techniques are typically limited to projecting simple fastener location information (e.g., a point or crosshair projected onto the part). If a designer wishes to project or display any additional information about the fastener, he or she manually generates curves or other information in the CAD model, which is time-consuming and prone to error given the large quantity of fasteners on a typical aircraft assembly. Further, no additional information about the fasteners is converted using the current laser projection software, such as hole size or fastener type. Accordingly, the capabilities of current projection methods are limited by such software. Moreover because current projection methods are typically implemented such that the non-geometric information about the fasteners is processed separately, it is difficult to ensure configuration control, especially with large and complex manufacturing projects.

SUMMARY

The present invention is directed toward methods and systems for providing and formatting data used in laser projection, including laser projection used in parts manufacturing and assembly. A method in accordance with one embodiment of the invention includes receiving engineering data associated with objects to be assembled (e.g., airplane parts) using fasteners, extracting fastener attribute data from the received engineering data, and processing the extracted fastener attribute data to generate a laser projection file. In some embodiments, the laser projection file may include geometric data used to project, onto the objects to be assembled, an image associated with the fasteners. The image associated with the fasteners, may include geometric information associated with a retention feature of the fastener, such as the shape and orientation of a nut element associated with the fastener. The laser projection file may also include non-geometric data associated with the fasteners. The method may further include outputting the laser projection file to enable the laser projection of the image as well as displaying the non-geometric data associated with the fasteners at a user interface associated with controlling the laser projection of images.

In particular embodiments of the invention directed toward the projection of fastener geometric location and orientation information, the method can further include formatting fastener attribute data for processing, where the attribute data may include geometric information about the placement of the fasteners with respect to the part or parts to be assembled, geometric information including edge-of-part information related to the part or parts to be assembled, and non-geometric attribute information related to the fasteners.

The method may further include assigning a first set of graphic symbols to the geometric information about the placement of the fasteners on the outside of the assembly, assigning a second set of graphic symbols to the geometric information about the location and orientation of the fasteners and retaining elements, such as nut elements, on the inside of the assembly, and mathematically transforming the assigned graphic symbols in three-dimensional space to produce geometric information for a laser projection output file. In addition, the non-geometric attribute information included in the laser projection output file may be sorted based on the information about attribute names and other information. The non-geometric attribute information may also be used to group the information in the laser projection output file.

A system for providing and formatting data used in laser projection in accordance with another embodiment of the invention includes a computer design application for generating a design file having fastener attribute data associated with a structure to be manufactured, and a file formatting subsystem for extracting the fastener attribute data from the design file to generate a laser projection output file, including the laser projection output files described above. In addition, the system may include a laser projector and a laser projector controller, which includes an interface component for displaying both the geometric and the non-geometric data included in the output file.

DETAILED DESCRIPTION

The following disclosure describes systems, methods, and formats for providing and formatting data used in laser projection. The term "data" is used herein in the collective sense to mean a set of one or more datum. The laser projection technique can be used to manufacture parts, for example, to assemble parts together using fasteners. Certain specific details are set forth in the following description and in FIGS. 1-9 to provide a thorough understanding of various embodiments of the invention. Well-known structures, systems and methods often associated with laser projection systems and, more generally, computer systems have not been shown or described in detail to avoid unnecessarily obscuring the description of the various embodiments of the invention. Those of ordinary skill in the relevant art will understand that additional embodiments of the present invention may be practiced without several of the details described below.

Many embodiments of the invention described below may take the form of computer-executable instructions, including routines executed by a programmable computer (e.g., a computer-controlled design process). Those skilled in the relevant art will appreciate that the invention can be practiced with other computer system configurations as well. The invention can be embodied in a special-purpose computer or data processor that is specifically programmed, configured, or constructed to perform one or more of the computer-executable instructions described below. Accordingly, the term "computer" as generally used herein refers to any data processor and includes Internet appliances, hand-held devices (including palm-top computers, wearable computers, cellular or mobile phones, multi-processor systems, processor-based or programmable consumer electronics, network computers, minicomputers and the like).

The invention can also be practiced in distributed computing environments, where tasks or modules are performed by remote processing devices that are linked through a communications network. In a distributed computing environment, program modules or subroutines may be located in both local and remote memory storage devices. Aspects of the invention described below may be stored or distributed on computer-readable media, including magnetic and optically readable and removable computer disks, as well as distributed electronically over networks. Data structures and transmissions of data particular to aspects of the invention are also encompassed within the scope of the invention.

I. Representative Environment

Figure 1:
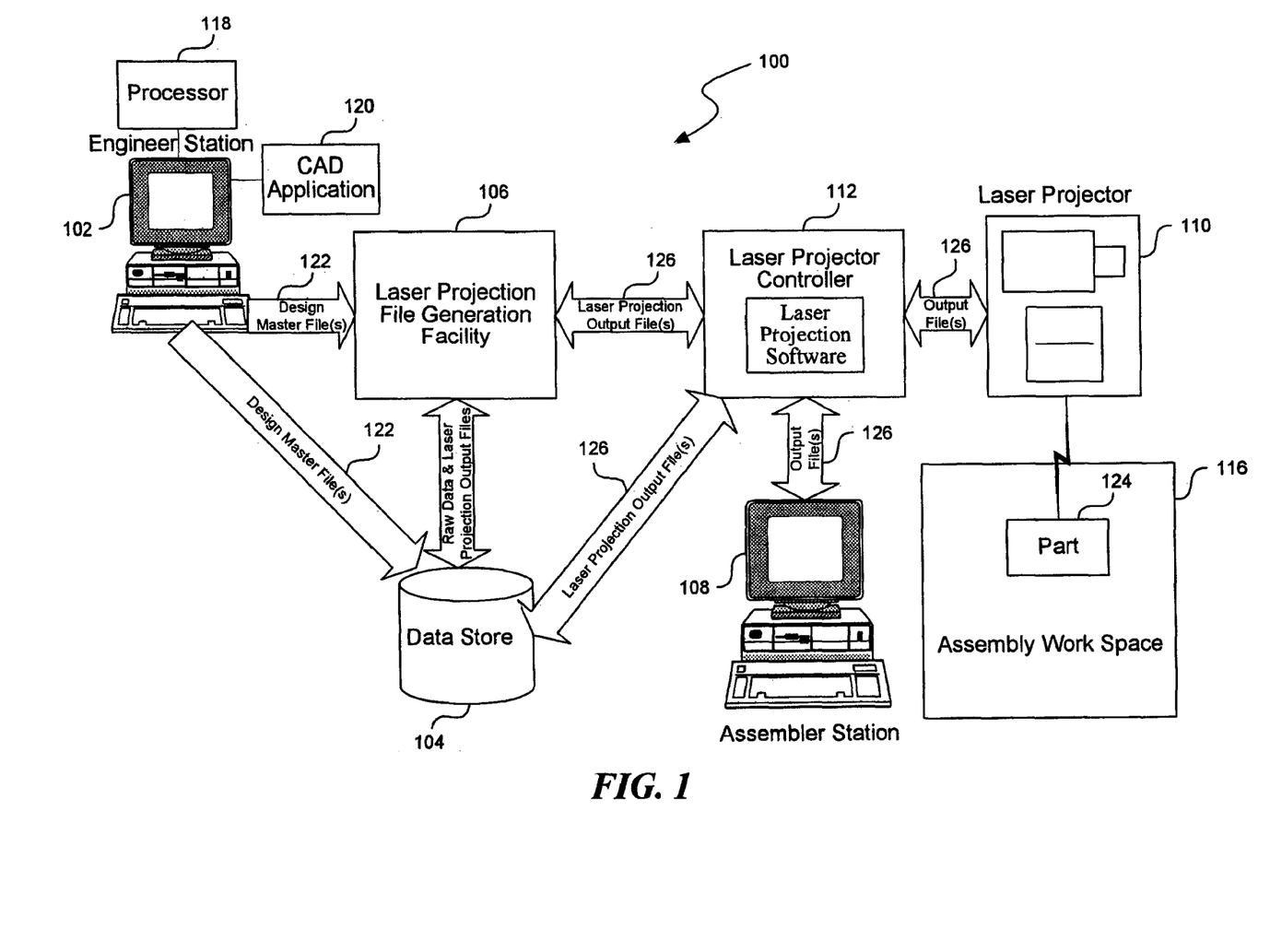
FIG. 1 is a block diagram illustrating a representative environment for practicing an embodiment of the invention.

FIG. 1 is a block diagram illustrating a representative environment 100 for practicing an embodiment of the invention. The environment 100 can include an engineer station 102, a data store 104, a laser projection file generation facility 106, an assembler station 108, a laser projector 110, a laser projector controller 112, laser projection software 114, and a work space 116.

The engineer station 102 can include a processor 118 and computer aided drafting (CAD) and/or computer aided modeling (CAM) software application 120. The CAD/CAM software application 120 may be configured to allow a user (e.g., design engineer) to create a design master file 122 relating to a part 124 (or collection of parts). The design master file 122 may be transferred directly to the laser projection file generation facility 106 or may be stored in the data store 104 until the part 124 is ready for assembly. In some embodiments, the laser projection file generation facility 106, may access the design master file 122 via a computer network (shown as connecting arrows). The laser projection file generation facility 106 produces one or more laser projection output files 126 that the laser projector controller 112 uses to instruct the laser projector 110 to display an appropriate laser image on the part 124 in the work space 116. In addition, the laser projection output files 126 may provide output for display at the assembler station 108.

Figure 5:
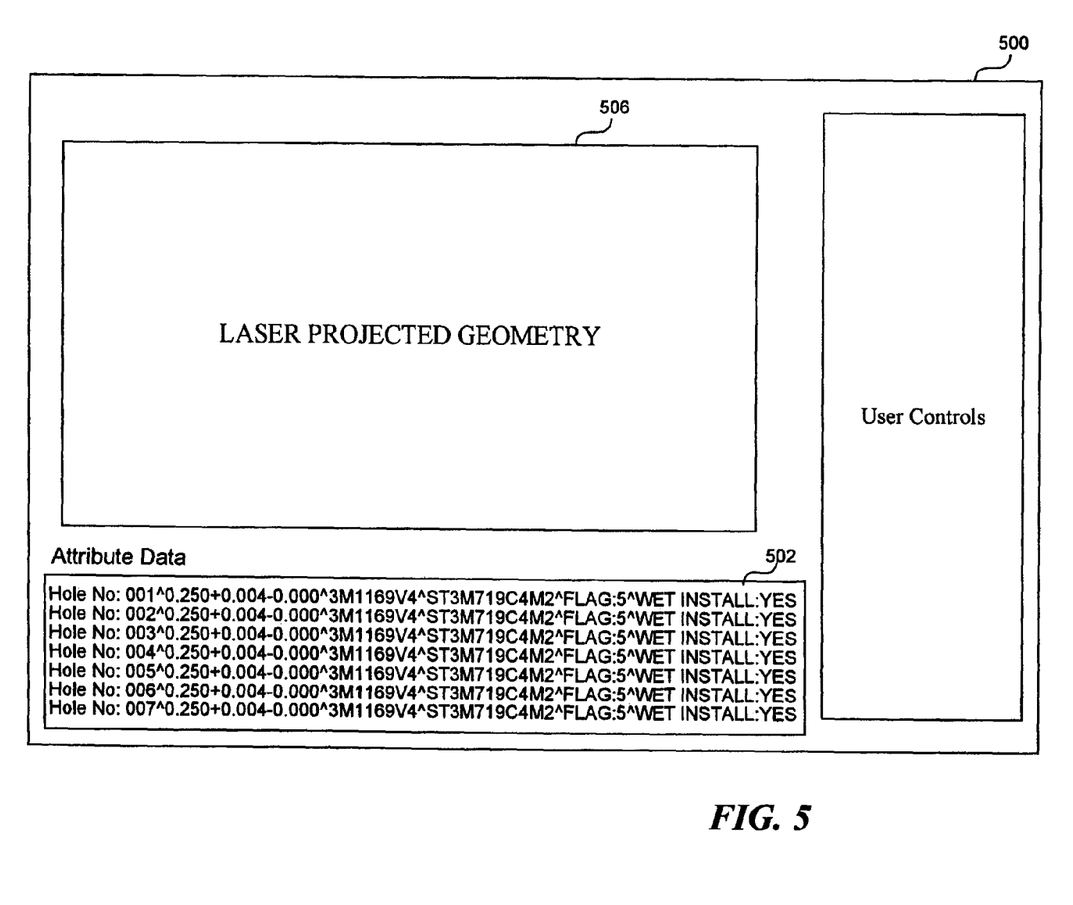
FIG. 5 is a display diagram illustrating an example of a user interface used in association with a laser projection process.

For example, a user interface at the assembler station 108 may display to a user (e.g., an assembler) attributes originally included in the design master file 122. The user can then use this information to perform work on the part 124. FIG. 5 provides an example of a user interface that may be used for this type of display.

II. Data Structures and Data Format

Figure 2:
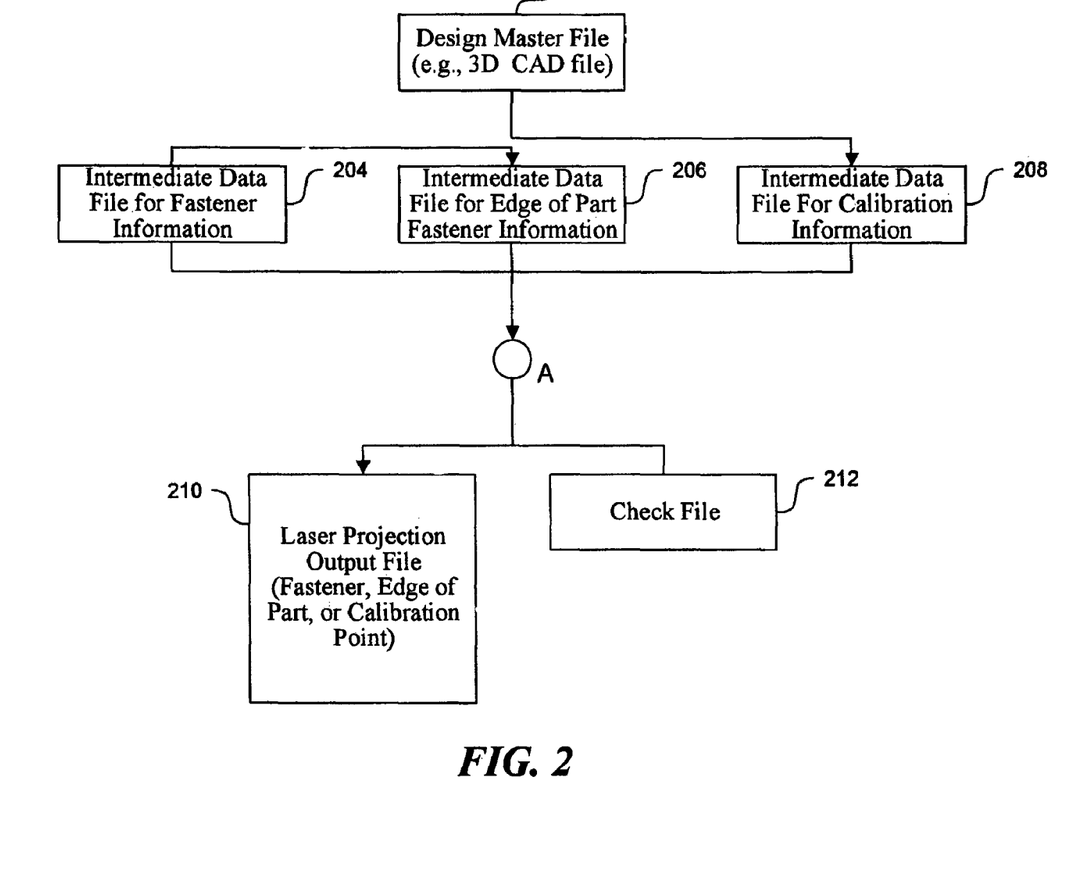
FIG. 2 is a block diagram illustrating the types of files used for practicing an embodiment of the invention.

FIG. 2 is a block diagram illustrating the types of files used in the data formatting process for an embodiment of the invention where laser projection activities include projecting outlines and other information relating to part fasteners. The laser projection activities begin with a design master file 202 (e.g., generated by a design engineer using a design tool such as Unigraphics, CATIA or another CAD/CAM-type application). The design master file 202 may specify edge-of-part information that relates to part geometry (e.g., points, angles, and lines) that defines parts to be assembled. A laser projector may then use this edge-of-part information when projecting a laser image. The design master file 202 may also specify fastener information, which may include, but is not limited to a location of the fastener, a class of hole in which the fastener is positioned, a fastener diameter, a fastener type, a nut element type, and a nut element orientation. In some embodiments, the design master file 202 is initially generated based on a seed file configured in accordance with criteria specified by a facility used to generate laser projection files, such as the laser projector file generation facility 106 of FIG. 1. The design master file 202 can also include calibration point information that allows a laser projector to be aligned relative to the parts and fasteners in three-dimensional space.

Figure 3:
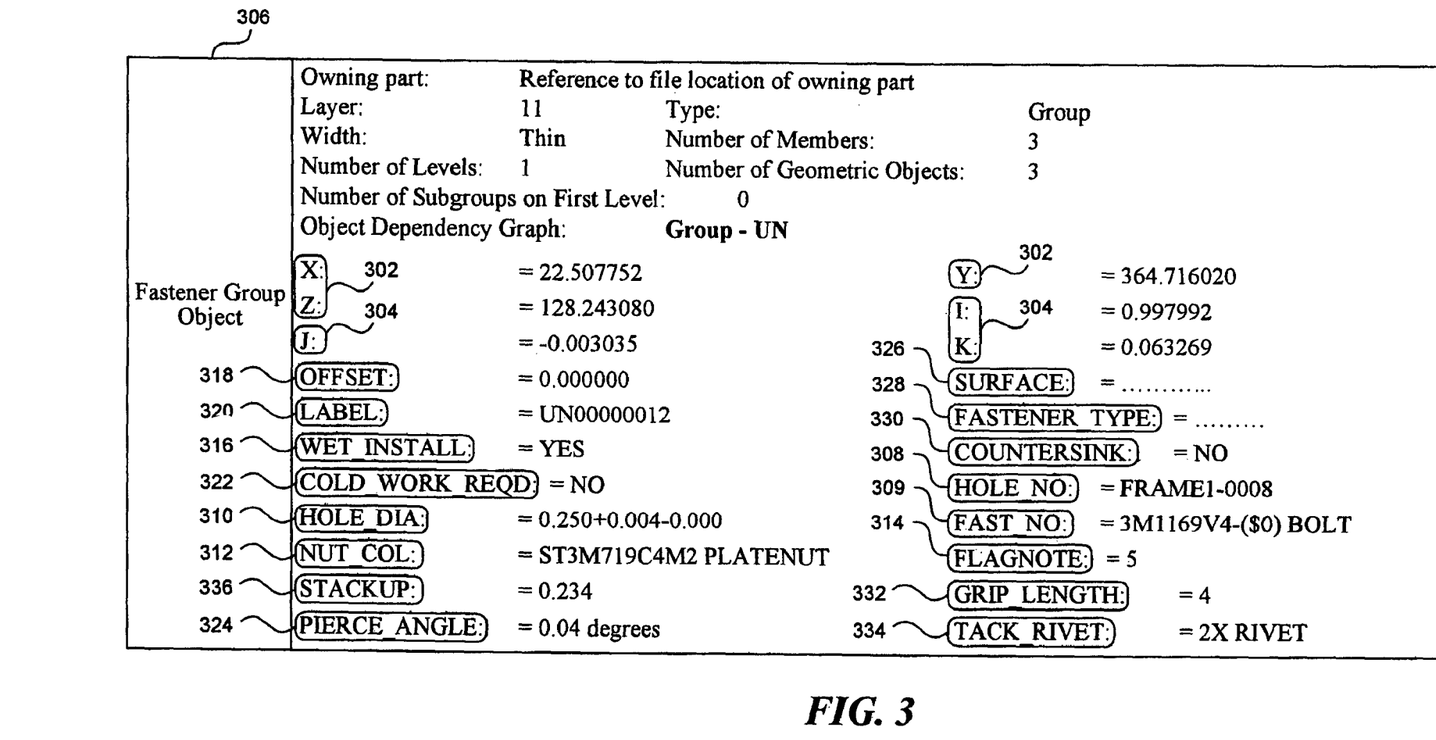
FIG. 3 is a block diagram illustrating a data structure associated with fastener information that can be used in generating a laser projection output file in accordance with an embodiment of the invention.
Figure 4:
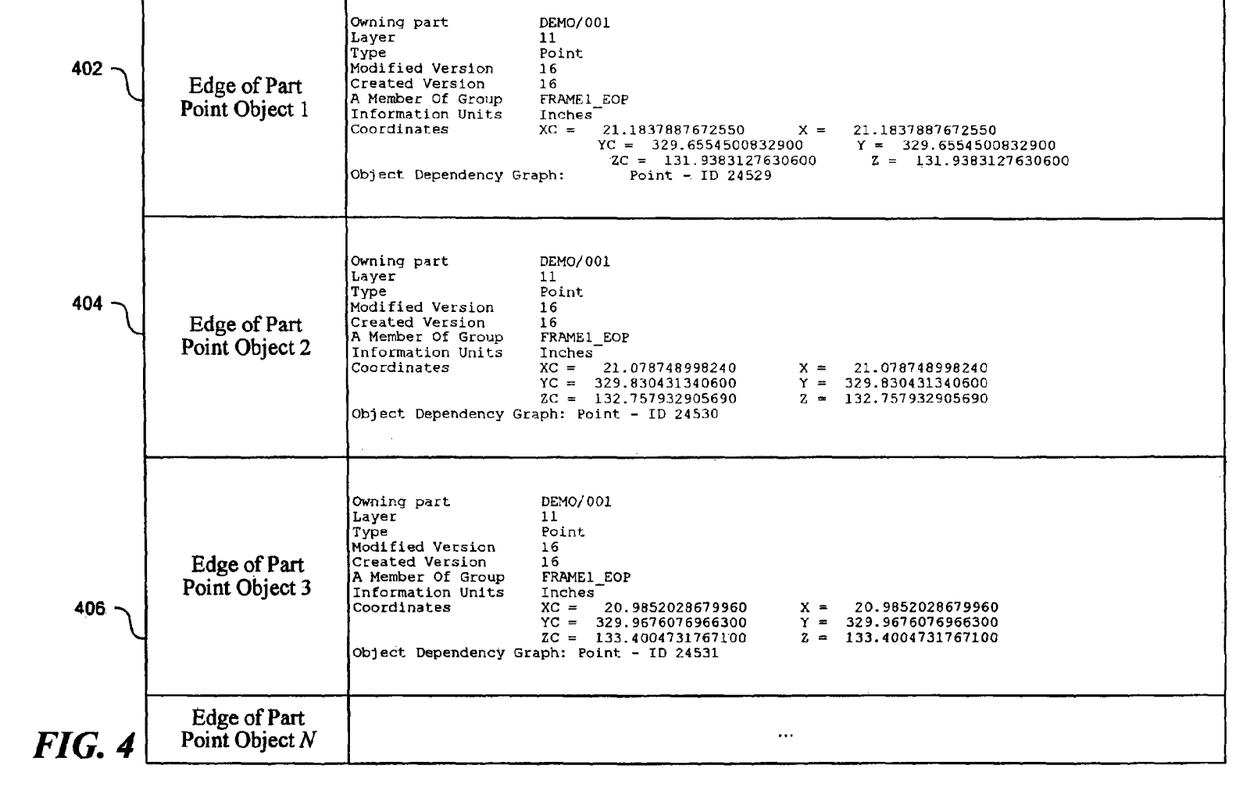
FIG. 4 is block diagram illustrating a data structure associated with edge-of-part information that can be used in generating a laser projection output file in accordance with an embodiment of the invention.

Data from the design master file 202 may then be exported into one or more intermediate data files (204, 206, and 208). The intermediate data files (which may be text files, XML files, etc.) may be related to fastener information (intermediate data file 204), edge-of-part curve information (intermediate data file 206), calibration point information (intermediate data file 208), or a combination of these types of information. In general, the calibration point file 208 provides multiple targets (e.g., six) used to align laser projections to parts in three-dimensional space. FIG. 3 provides additional description relating to the fastener data file 204. FIG. 4 provides additional description relating to the edge-of-part data file 206.

Referring again to FIG. 2, a laser projection file generation facility, such as the laser projection file generation facility 106 of FIG. 1, may process and reformat the data contained in the data files (204, 206, and 208). In some embodiments, the processing may include using macros in Microsoft Excel and/or other macros implemented in Visual Basic to generate one or more laser projection output files 210. A commercially available laser projector controller, such as the laser projector controller 112 of FIG. 1, can then use the laser projection output file 210 to project a laser image on a part or parts in a work space. The laser projection output file 210 may contain fastener information, edge-of-part curve information, calibration point information, etc., including non-geometric information (e.g., part names, fastener names, notes, specifications, etc.). In some embodiments, the laser projector controller may upload the laser projection output file 210 directly from the laser projection file generation facility. Once the upload of the laser projection output file 210 is complete, the laser projector can project a laser image that the assembler can use to properly assemble the parts.

In some embodiments, non-geometric attribute data from the original design master file 202 is maintained in the laser projector output file 210 in addition to the geometric data used for laser projection (e.g., points, curves, and lines). Accordingly, at the same time the laser image is being projected onto the part, the assembler can access the non-geometric attribute information contained in the laser projection output file 210 via a user interface at a nearby assembler station computer (further details of which are described later with reference to FIG. 5). In addition, the laser projection file generation facility may generate check files 212 that can be used to verify in the CAD/CAM application that the projection output file 210 was generated correctly.

FIG. 3 shows fastener information captured in a data file originating from a design master file, such as the data file 204 and design master file 202, respectively, of FIG. 2. As shown, fastener information may be classified into groups 306, with fastener Cartesian coordinates (X, Y, Z) 302 and fastener Cartesian vectors (I, J, K) 304 generally making up the geometric contents of groups 306. The projected fastener information generally includes geometric information relating to fastener symbols (such as crosshairs) on outer assembly surfaces, and fastener retainer or plate nut symbols on inner assembly surfaces (described in greater detail below with reference to FIG. 7). However, as shown in the groups 306, additional information relating to fasteners may be shown. Examples of such information include hole number 308, hole diameter 310, fastener type 328, and fastener number 314. Other information relating to fasteners may include nut name 312, and flag note number(s) 314. Wet install information 316, offset information 318, label information 320, cold work required information 322, pierce angle information 324, and surface information 326 may provide further instructions for installing fasteners. Countersink information 330, grip length information 332, tack rivet information 334, and assembly stack up thickness 336 may also be imported into the laser projection output file. In this way, the laser projection software interface can display this information to the assembler or another user, in addition to the laser projector projecting a laser image into three-dimensional space.

FIG. 4 shows edge-of-part information captured in an intermediate data file originating from a design master file such as the intermediate data file 206 and design master file 202, respectively, of FIG. 2. The edge-of-part information generally includes a series of point objects (402, 404, and 406) that can be connected in a graph to form a laser projection image of the edge of a part. For example, the laser projection output file generated from this information may be used for assembly verification, part location, and fastener edge distance measurements.

III. Sample User Interface

Figure 6:
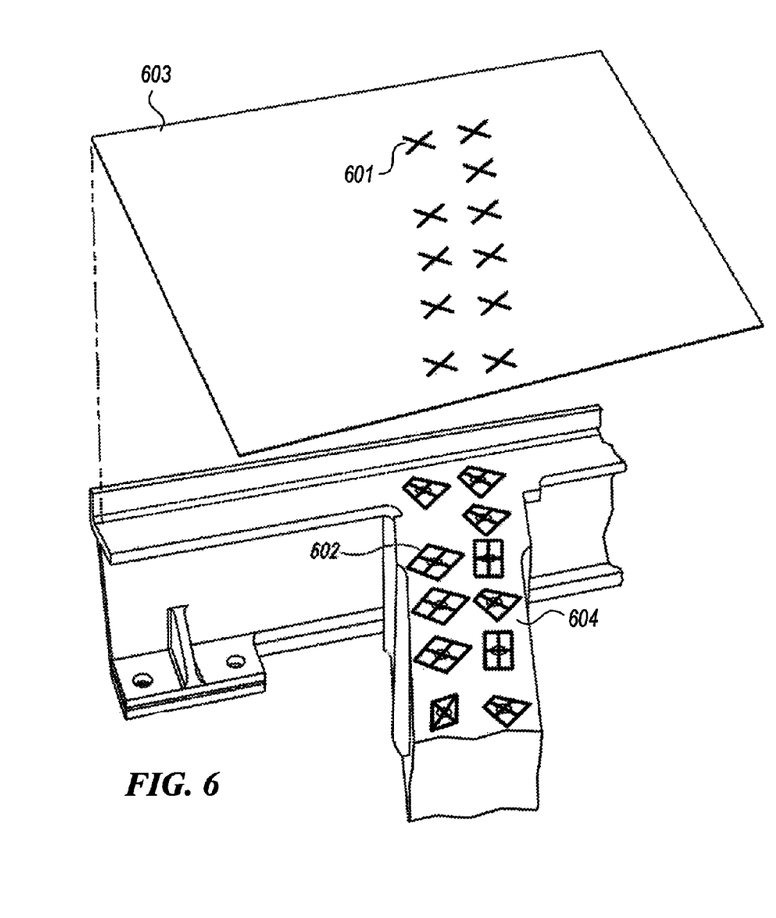
FIG. 6 illustrates a partially schematic downward-looking exploded view of a part in which fasteners are to be installed using laser projection in accordance with an embodiment of the invention.

FIG. 5 is a display diagram illustrating a typical commercially available laser projection user interface 500 that is displayed to the assembler on a screen at an assembler station during a laser projection process. In some embodiments, the assembler uses the interface to select the projection of one or more desired hole numbers into which fasteners will be placed. The laser projector then projects the appropriate fastener or nut element symbol for each of these selected holes onto the part or parts in the work space. FIG. 6 is a partially schematic downward looking exploded view of an assembly in which fasteners and nut elements are to be installed in accordance with one embodiment of the invention, and also shows an example of laser projected fastener symbols 601 on an outer assembly surface 603, as well as the corresponding laser projected symbols of oriented nut elements 602 on an inner assembly surface 604.

Referring back to FIG. 5, the interface 500 may also provide a fastener description box 502, which shows detailed attribute information for each of the selected hole numbers. In some embodiments, naming conventions used in the design master file, including custom naming conventions, may be preserved during the output file generation process, and may thus be displayed in the description box 502. In some embodiments, the assembler can choose to have some of the information shown in the description box projected onto the part, along with the fastener or nut element symbol 602 or other geometric information. In addition, the interface 500 may include a laser view portion 506 that can be used to display laser projected geometry 504.

Some fasteners, such as floating anchor/plate nuts, include a nut element feature that comprises a flat or U-shaped channel of sheet metal that, for example, allows the fastener to be riveted or clinched onto a part (in addition to the fastener). Parts manufacturers may use fasteners having several different types of nut elements (or similar retention features), with each type having its own configuration and shape. In addition, many nut elements are not symmetrical. Accordingly, engineer design specifications often include specific instructions on the placement and orientation of fasteners that include nut elements, especially where spacing between fasteners is limited. In some cases, it is possible to present such instructions geometrically, which makes them suitable for laser projection.

Figure 7:
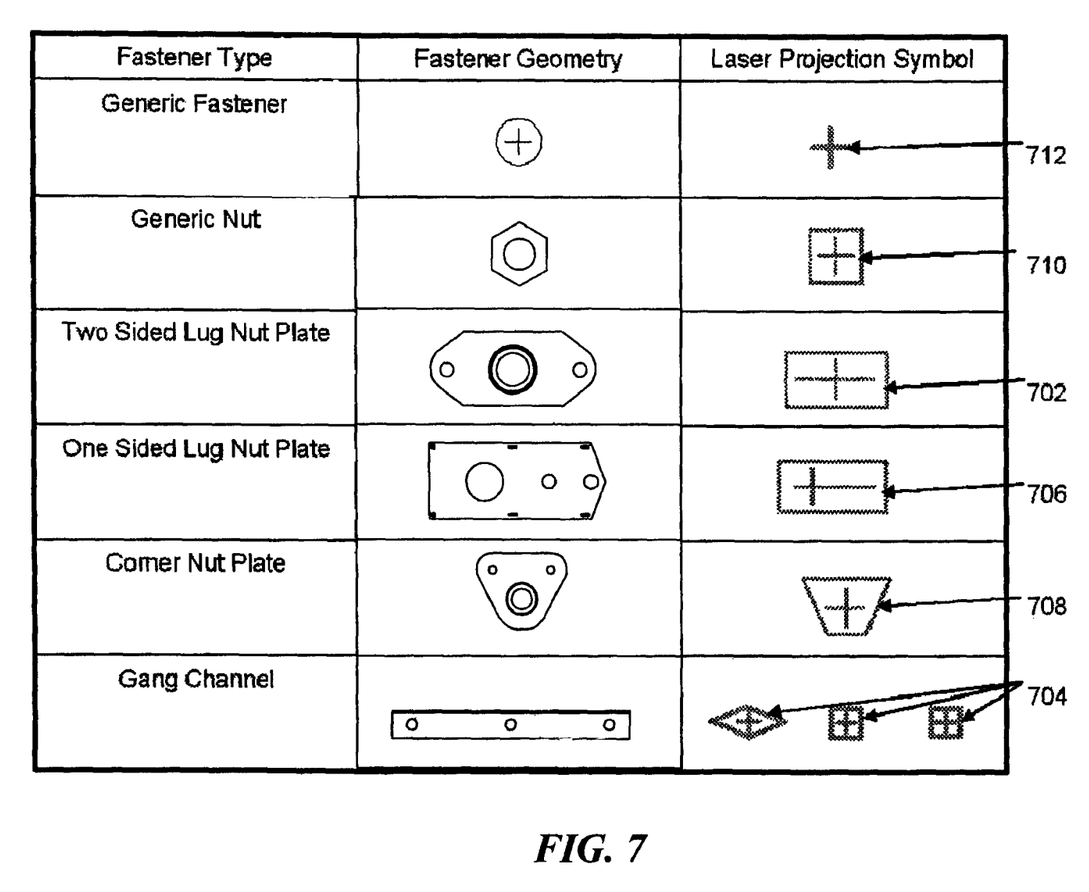
FIG. 7 is a display diagram showing laser projectable graphical symbols associated with fastener nuts and retaining elements used in an embodiment of the invention.

FIG. 7 is a display diagram showing sample geometries for a series of fastener configurations that may be used in some embodiments. In the illustrated embodiment, the laser projector may project the fastener geometry, which can then be used to guide the assembler in correctly locating and orienting that fastener or retention feature. Accordingly, the laser projection system may be configured to process fastener specifications contained in master design files and to generate a corresponding fastener graphic symbol (e.g., symbol 702, symbol 704, symbol 706, symbol 708, symbol 710, symbol 712, etc.)

As illustrated, each symbol may approximate the shape of extremities of the fastener or retention feature. For example, symbol 702 corresponds to plate nuts having attaching lugs on two sides of the fastener or retention feature. In addition, each symbol may be associated with a set of fastener types that are of similar configuration, but different part numbers.

IV. Representative Flows

Figure 8:
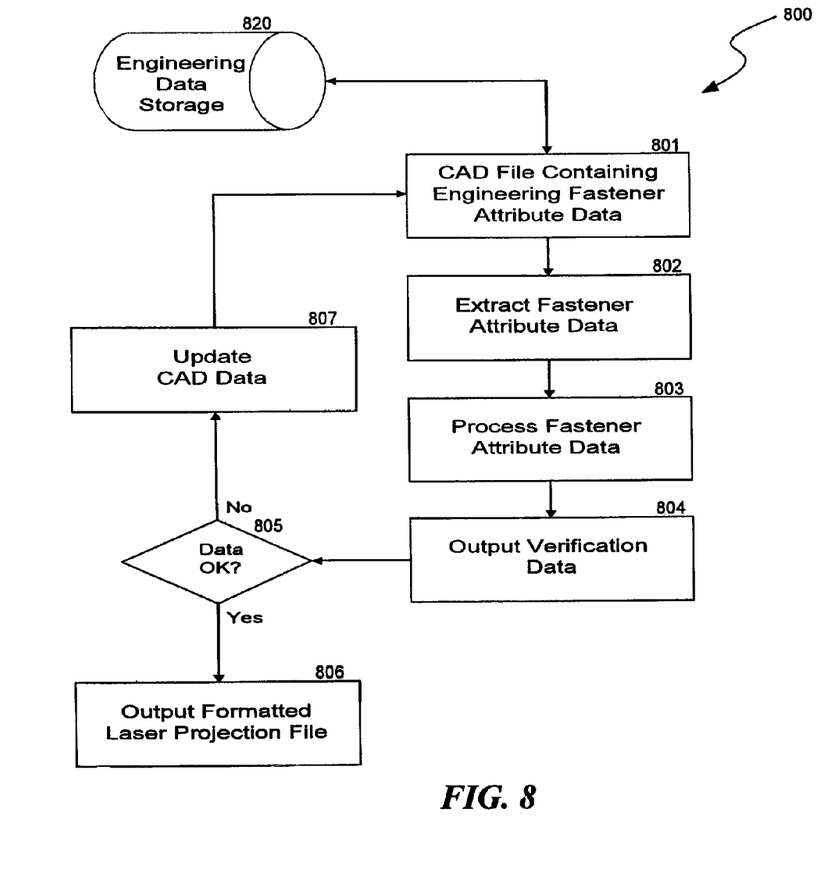
FIG. 8 is a flow diagram illustrating a routine for creating a laser projection output file in an embodiment of the invention.
Figure 9:
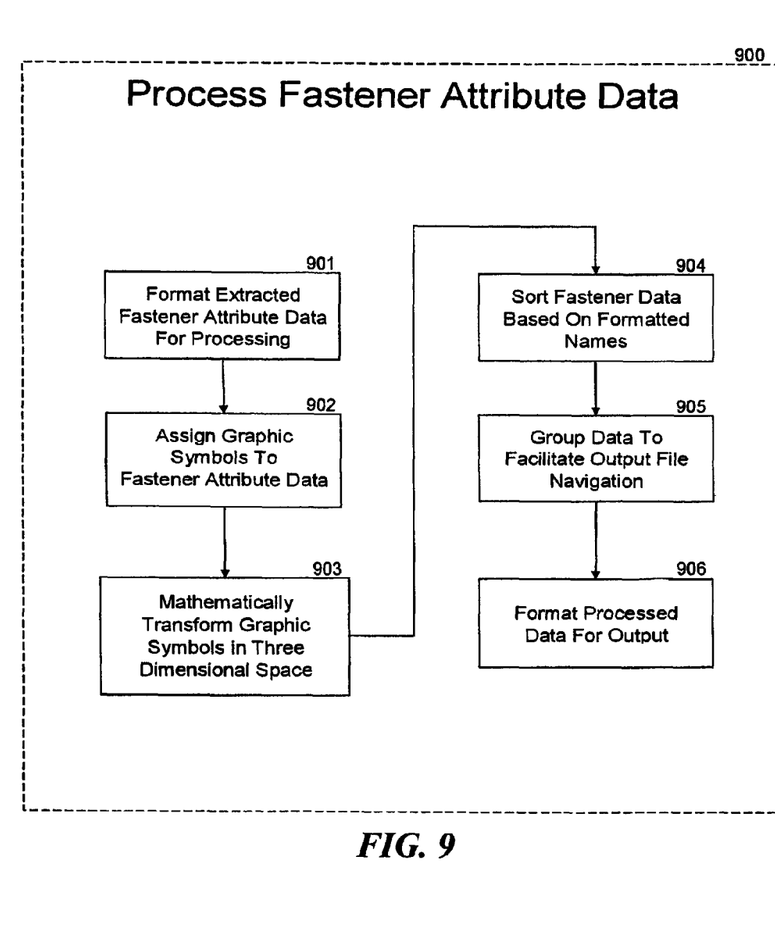
FIG. 9 is a flow diagram illustrating a more detailed routine for creating a laser projection output file in an embodiment of the invention.

FIGS. 8 and 9 are flow diagrams illustrating routines involved in generating laser projection files in one embodiment of the invention. A more general routine 800 for generating laser projection output files is displayed in FIG. 8. At block 801, a design master file (e.g., CAD file) is retrieved from an engineering data store 820. The design master file may contain attribute data (e.g., attributes of a part or fastener for which laser projection data is to be generated). The attribute data may include numeric data that can be used to geometrically define objects for use in a laser projection process. The attribute data may also include other data that can be used in association with the laser projection process, such as non-geometrical information about a fastener or part.

At block 802, the routine 800 extracts the geometric and non-geometric attribute data from the design master file. At block 803, the routine 800 processes the attribute data so that it can be used in the laser projection process, either as geometric data for laser projection, or as non-geometric data presented at an interface associated with the laser projector. An example of a subroutine for processing attribute data for fastener laser projection is described below with respect to FIG. 9.

At block 804, the routine 800 performs verification on the processed data. At decision block 805, if the processed data is successfully verified, the routine 800 continues at block 806, where the data is formatted into the form of a laser projection output file. If at decision block 805, the data verification is not successful, the routine 800 continues at block 807, where the original design master file (e.g., CAD file) is updated (either manually or automatically) to correct errors that resulted in the unsuccessful validation. The routine 800 then loops back to block 801, to retrieve the updated design master file (e.g., CAD file).

Referring to FIG. 9, a subroutine 900 for processing fastener attribute data (e.g., block 803 of FIG. 8) is shown. At block 901 the routine 900 formats extracted fastener attribute data for processing. The extracted fastener attribute data may include the pertinent information from the design master file, which is then placed into a standard format for further processing. At block 902, the routine 900 assigns graphic symbols to fastener attribute data. For example, the routine may assign crosshair geometry to outer assembly surface point locations and/or assign standard nut plate geometry to inner assembly surface point locations. The geometry may be ordered sets of X, Y, Z point data. In some embodiments, the laser projector uses this information to create an image by tracing lines between the X, Y, Z points in space. At block 903, the routine 900 transforms the graphic symbols of block 902 in three-dimensional space. For example, the routine 900 may transform crosshair and nut plate geometry to the correct X, Y, Z point data and perform calculations that allow the resulting laser image to be rotated to a correct orientation relative to local X, Y, Z axes. In some embodiments, the basic X, Y, Z coordinates and I, J, K rotation vectors from the outer and inner assembly surface locations are part of the extracted data from the design master output file.

At block 904, the routine 900 sorts fastener data based on formatted names. For example routine 900 may sort the newly formatted data by fastener number, fastener diameter, or any other fastener attribute that may be helpful in the manufacturing process. In addition, this allows the output file information to retain naming conventions used in the original design master file. At block 905, the routine 900 groups data to facilitate output file navigation. For example, the laser projection generation facility may automatically group fasteners into groups of ten to facilitate projector file navigation and laser projector resolution. This may also enable the reduction of laser "flash," which typically occurs when the laser projector attempts to project too much geometry at one time.

At block 906, the routine formats processed data for output. For example, once the data are sorted or grouped, the routine 900 may format the fastener attribute information and geometry (i.e., X, Y, Z coordinates) into a special ASCII file for output to the laser projection controller. In some embodiments, the routine 900 can output data for outer assembly surface fastener crosshair locations, CAD-oriented inner assembly surface nut plate locations, or a combination of the oriented inner assembly surface nut plate locations with the corresponding edge-of-part curves for checking proper location of mating parts and fastener edge distance. In some embodiments, the subroutine 900 described above, may also handle the processing of fastener data to produce information that generates a laser projected image of a graphical symbol representing a fastener or retention element, such as those shown and described with respect to FIG. 7.

From the foregoing, it will be appreciated that specific embodiments of the invention have been described herein for purposes of illustration, but that various modifications may be made without deviating from the spirit and scope of the invention. For example, aspects of the invention described in the context of particular embodiments may be combined or eliminated in other embodiments. Although advantages associated with certain embodiments of the invention have been described in the context of those embodiments, other embodiments may also exhibit such advantages. Additionally, none of the foregoing embodiments need necessarily exhibit such advantages to fall within the scope of the invention. Accordingly, the invention is not limited except as by the appended claims.

We claim:

1. A computer-readable storage medium storing a data structure, the data structure comprising:
    geometric information used to project a laser image associated with fasteners used in assembling a part or parts,
        wherein the geometric information is based on engineering data extracted from a file generated using an engineering design application,
        wherein the laser image includes geometry relating to an orientation of a retention feature associated with the one or more fasteners, and
        wherein the geometry relating to the orientation of the retention features is automatically generated based on fastener attribute data in the extracted engineering data; and
    non-geometric data associated with the fasteners, wherein the non-geometric data is based on the extracted engineering data, and wherein the non-geometric data is displayed in a user interface associated with controlling projection of the laser image.

2. The computer-readable storage medium of claim 1 wherein the geometric information includes information for projecting a first laser image associated with the part or parts and a second laser image associated with the part or parts.

3. The computer-readable storage medium of claim 1 wherein the computer-readable storage medium includes a memory of a laser projector controller.

4. The computer-readable storage medium of claim 1 wherein the computer-readable storage medium includes a computer-readable disk.

5. The computer-readable storage medium of claim 1 wherein the computer-readable storage medium includes a memory of a computer system.

6. The computer-readable storage medium of claim 1 wherein the non-geometric attribute data includes information relating to a hole number associated with a fastener.

7. The computer-readable storage medium of claim 1 wherein the non-geometric attribute data includes information relating to a hole diameter associated with a fastener.

8. The computer-readable storage medium of claim 1 wherein the non-geometric attribute data includes information relating to a hole type associated with a fastener.

9. The computer-readable storage medium of claim 1 wherein the non-geometric attribute data includes fastener information relating to a hole tolerance associated with a fastener.

10. The computer-readable storage medium of claim 1 wherein the non-geometric attribute data includes information relating to a fastener type.

11. The computer-readable storage medium of claim 1 wherein the non-geometric attribute data includes information relating to a fastener retention feature.

12. The computer-readable storage medium of claim 1 wherein the non-geometric attribute data includes information relating to an assembly note.

13. The computer-readable storage medium of claim 1 wherein the non-geometric attribute data includes information relating to whether a fastener should be installed using a wet installation technique.

* * * * *